United States Patent Office 3,758,488
Patented Sept. 11, 1973

3,758,488
PROCESS FOR PREPARING THIAZOLE
DERIVATIVES
Stephan P. Kukolja and Robert B. Morin, Indianapolis,
Ind., assignors to Eli Lilly and Company, Indianapolis,
Ind.
No Drawing. Original application May 16, 1969, Ser. No.
825,401, now Patent No. 3,702,328. Divided and this
application July 1, 1971, Ser. No. 159,024
Int. Cl. C07d 91/32, 99/10
U.S. Cl. 260—302 R     5 Claims

ABSTRACT OF THE DISCLOSURE

Process for preparing thiazolecarbonylamino-substituted butenoic acids and new thiazolecarbonylamino-substituted oxazolone compounds, e.g., 2 - [N-(2-phenoxymethyl-4-thiazolyl)carbonyl]amino-3-methyl-butenoic acid, and 2-(2' - phenoxymethyl-4'-thiazolyl)-4-isopropylidene-5-oxazolone by treating a 2-(2-substituted-amido-1-thioacetyl-2-ethenyl)-4-isopropylidene-5-oxazolone with acid or base, in an inert organic solvent, or in admixture with the alcohol of the desired ester, which products of the process can be used as antibiotics and anti-fungal agents, as intermediates in the synthesis of penicillin and cephalosporin compounds and as antiradiation chemicals.

CROSS REFERENCE

This application is a division of application Ser. No. 825,401, filed May 16, 1969, now U.S. Pat. No. 3,702,328.

BACKGROUND OF THE INVENTION

Morin and Jackson U.S. Pat. 3,275,626 discloses that penicillin sulfoxides can be rearranged with heat to a mixture of products, among which products are the desacetoxycephalosporins, which lead to valuable antibiotic substances. Since that time, workers in the penicillin and cephalosporin chemical arts have been studying the effects of various physical and chemical conditions on penicillin degradation products. Recently, new products which have been made by reacting or degrading penicillin sulfoxides with various reactants such as trialkyl phosphites and triarylphosphines, followed by reaction with trifluoroacetic acid or sodium acetate are the thiazole acids and esters of the formula

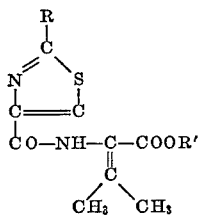

where R can be hydrogen, a hydrocarbon group, or a phenoxymethyl, phenylmercapto, or other group derived from the penicillin used to prepare such compounds, and R' is hydrogen, or the residue of ester used in the starting materials. These latter compounds have stimulated efforts to find alternative processes of preparing such compounds.

It is an object of this invention to provide an alternative process for preparing the thiazolecarbonyl amino-butenoic acids and esters thereof.

It is a further object of this invention to provide some new thiazole-oxazolone compounds, which can be made in the course of the process of this invention.

Other objects, aspects, and advantages of the invention will become apparent from reading the specification and claims which follow.

THE INVENTION

According to this invention, we have discovered a process for preparing compounds having a formula selected from the group consisting of (a) and (b)

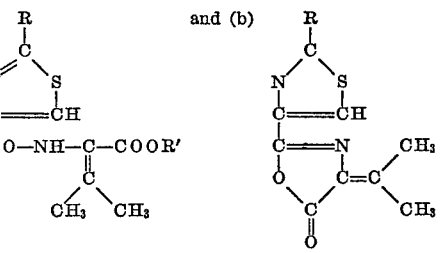

wherein R is hydrogen, a hydrocarbon radical, preferably having not more than about 12 carbon atoms, phenoxymethyl, phenylmercaptomethyl, or a similar group derived from a penicillin starting material, and R' is hydrogen, or the ester group of an alcohol present in the reaction mixture, which process comprises treating with acid or base in an inert organic solvent, or mixed with a desired alcohol, or an aqueous medium, an oxazolone compound of the formula (c)

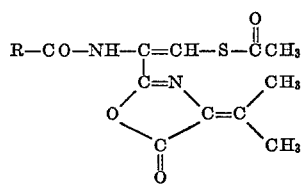

wherein R is as defined above, to form an acid or ester of Formula a, above, in admixture with the oxazolone compound of Formula b, or with aqueous base to form the compound of Formula a as the acid (R' being hydrogen).

The starting material of Formula c above can be prepared as one of several products obtained by the reaction of penicillin V with acetic anhydride at 120–130° C. for 45 minutes. The reaction of penicillin G with acetic anhydride was reported in the penicillin monograph, The Chemistry of Penicillin, The Princeton Press (1949) p. 168, and the appearance of the absorption maximum at 320 mμ was noticed. However, these compounds were neither contemplated, identified, or isolated. From our work, we now believe that a compound of Formula c was formed. The starting material (c) is isolated from the mixture by chromatography over silica gel by known procedures.

In conducting the process of this invention using the acidic procedures, the oxazolone starting material of Formula c is dissolved in an inert organic solvent such as methylene chloride, chloroform, benzene, heptane, toluene, or the like and saturated with hydrogen chloride gas, with hydrogen bromide, or mixed with an acid such as sulfuric acid, p-toluenesulfonic acid, or other non-oxidizing acid, and is allowed to stand or is agitated for from about one hour to 24 hours, at 0° to 50° C., preferably at room temperature to form the compound of Formula a, mixed with compound of Formula b. Compounds of Formula a generally precipitate first from the solution and can usually be separated from the reaction mixture by filtration procedures, and purified by recrystallization from organic solvents, e.g., ethanol, ethyl acetate, and the like, by known procedures. Compounds of Formula b are generally recovered by evaporating the solvent from the reaction mixture after the precipitate containing compound of Formula a has been separated, and redissolving the residue in an appropriate solvent such as ethanol, ethyl acetate, acetone, and the like for recrystallization therefrom. Mixed re-crystallization solvent systems such as ethanol/acetone, acetone/ethyl acetate, nitromethane/ethyl acetate and the like can be used to effect purification.

The thiazole-containing butenoic acid compounds of Formula a can also be obtained by treating the oxazolone starting material with a base, preferably an aqueous alkali metal hydroxide solution, e.g., sodium hydroxide, potassium hydroxide, or with a trialkylamine such as trimethylamine, tributylamine, pyridine, or the like.

In conducting the process of this invention to make esters of Formula a above, wherein R' is the ester group, the oxazolone starting material (c), as such or in solution, is mixed with an acidified alcohol mixture. The alcohol is that desired for the ester in the product (a) and is one which is liquid at the reaction temperature. The acid condition can be satisfied by any non-oxidizing acid but is preferably obtained by the use of hydrogen chloride, hydrogen bromide, sulfuric acid, p-toluene-sulfonic acid, methanesulfonic acid, or the like dissolved in the alcohol. Examples of alcohols which can be used to form the ester products are the $C_1$ to $C_8$-alkanols such as methanol, ethanol, isopropanol, tert-butanol, hexanol, and other alcohols known to produce easily cleavable esters of penicillin and cephalosporin compounds. Examples of such other alcohols which can be used to produce easily cleaved esters include 2,2,2-trichloroethanol, benzyl alcohol, p-nitrobenzyl alcohol, $C_4$ to $C_7$-tert-alkenyl alcohols such as tert-butenyl alcohol, tert-heptenyl alcohol, tert-alkynyl alcohols such as tert-pentynyl alcohol and tert-heptynyl alcohol, as well as trimethylsilyl alcohol, or the like. In some cases, chlorides or bromides may be used in place of the alcohol in this process to form the desired ester. For example, in place of the various benzyl alcohols which can be used, the corresponding benzyl chloride or bromide can be used in place of the alcohol in alkaline media, e.g., p-nitrobenzyl bromide, p-methoxybenzyl chloride, benzyl bromide, and the like.

In the starting materials (c) and in the products of the process (a) and (b), R can be hydrogen, a $C_1$ to $C_{12}$-hydrocarbon radical, or the residue of the acyl group in the 6-position of a penicillin excluding the —CO— group. Hence, R can be exemplified by $C_1$ to $C_{12}$-alkyl radicals such as methyl, ethyl, propyl, isopropyl, n-butyl-tert-butyl, heptyl, octyl, dodecyl, $C_2$ to $C_{12}$-alkenyl radicals such as propenyl, ethyl, butenyl, octenyl, undecenyl, $C_2$ to $C_{12}$-alkynyl, e.g., ethynyl, propynyl, hexynyl, and the like, cycloalkyl, and cycloalkenyl radicals such as cyclobutyl, cyclopentyl, cyclohexyl, cycloheptyl, cyclooctyl, cyclopentenyl, cyclohexenyl, and aromatic hydrocarbon groups such as phenyl, tolyl, phenylmethyl, phenylethyl, phenylpropyl. R can also be a wide variety of substituents common to the presently known penicillins. As a practical matter, R is generally hydrogen, or the hydrocarbon, hydrocarbon—O—CH$_2$—, hydrocarbon—S—CH$_2$— group from one of the commercially available penicillins produced on a scale. Thus, R is preferably phenoxymethyl from penicillin V (phenoxymethylpenicillin) phenylmethyl from penicillin G (phenylmethylpenicillin) phenylmercaptomethyl from phenylmercaptomethylpenicillin, as a $C_1$-$C_8$-alkyl group from one of the $C_1$-$C_8$-alkylpenicillins, and penicillins of these types substituted with non-interfering substituents such as chlorine, hydroxy groups, amino groups, and the like. Such a variety of R groups can be further exemplified by and obtained by the semi-synthetic precursor penicillin fermentation processes disclosed, e.g., in Behrens U.S. Pats. 2,479,295 to 2,479,297, 2,562,407 to 2,562,411, and 2,623,876.

The products of this invention can be used as antiradiation chemicals, generally as set forth in Radiation Research, 1, pp. 13–21 (1957). They can be used as intermediates in the synthesis of known and new β-lactam antibiotics. For this latter utility, the compounds of Formula a or b are subjected to photoisomerization conditions, e.g., as described generally in J. Am. Chem. Soc., 90, p. 2333 (1968) to form the β-lactam compounds, followed by treatment with a peracid oxidizing agent to form a mixture of a desacetoxycephalosporin sulfoxide and a 2-hydroxymethylpenicillin sulfoxide having the formulas

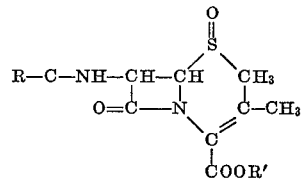

and

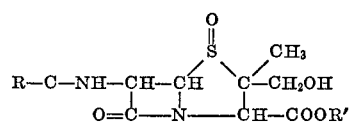

wherein R and R' are as defined above. The desacetoxycephalosporin sulfoxide compound can be separated from the 2-hydroxymethylpenicillin compound by known procedures and reduced to the desacetoxycephalosporin compounds by procedures now known, e.g., with sodium dithionite in acetyl chloride. Then the 7-acyl group can be cleaved by known procedures, for example, by treatment with PCl$_5$ and pyridine, followed by treatment with methanol, and then with water to form the 7-aminodesacetoxycephalosporanic acid (7-ADCA) or an ester thereof. The 7-ADCA acid or ester can then be treated with a variety of acylating agents. For example, a mixed anhydride form of D-α-phenylglycine in which the amino group of the glycine is protected, e.g. with tert-butoxycarbonyl or benzyloxycarbonyl can be reacted with the 7-ADCA or ester thereof, followed by removal of the amino protecting group and any ester group by known procedures to obtain cephalexin, a known orally absorbed antibiotic.

The thiazole acid and ester compounds are useful as antibiotics. For example, the compound 3-methyl-2-(2'-phenoxymethyl)-4'-thiazolylcarboxamido)butenoic acid, a compound of Formula a above, is active as an antibiotic against the bacterial organism, Pseudomonas solanacearum, strain ×815 at a concentration of 100 micrograms/ml. as determined by an agar dilution test method, described by Steers and Poltz in Antibiotics and Chemotherapy, 9, p. 307 (1959). As another example, the ester, methyl N-(2'-phenoxy methyl-4'-thiazolylcarbonyl)-2-amino-3-methylbutenoate is active against the fungus Botrytis cinerea at a concentration of 100 micrograms per milliliter in a similar agar dilution test. These compounds can be compounded into ointment and lotion compositions by known methods and applied to surface cuts and abrasions to prevent infections by Pseudomonas type organisms. The new thiazole-oxazolone compounds of Formula b are more important for their use as intermediates for the preparation of compounds of Formula a by acid hydrolysis thereof.

Additional compounds which can be prepared by the acidic or basic hydrolysis procedures of this invention are exemplified by the following:

N-(4 - thiazolylcarbonyl) - 2 - amino-3-methyl-2-butenoic acid and 2-(4'-thiazolyl)-4-isopropylidene-5-oxazolone from 2-(2'-formamido-1'-thioacetyl-2'-ethenyl)-4-isopropylidene-5-oxazolone in methylene chloride saturated with hydrogen chloride;

N - (2' - heptyl-4'-thiazolylcarbonyl)-2-amino-3-methyl-2-butenoic acid and 2-(2'-heptyl-4'-thiazolyl)-4-isopropylidene-5-oxazolone from 2-(2'-heptanoylamido-1-thioacetyl-2-ethenyl) - 4 - isopropylidene-5-oxazolone and hydrogen bromide in benzene;

N - (2' - phenylmercaptomethyl - 4' - thiazolylcarbonyl)-2-amino-3-methyl-2-butenoic acid and 2-(2'-phenylmercaptomethyl-4'-thiozolyl)-4-isopropylidene - 5 - oxazolone from 2-(2'-phenylmercaptoacetamido-1'-thioacetyl-2-ethenyl)-4-isopropylidene-5-oxazolone and p-toluenesulfonic acid in heptane;

Tert-butyl N - (2' - phenylmethyl-4'-thiazolylcarbonyl)-2 - amino - 3 - methyl-2-butenoate and tert-butyl 2-(2'-phenylmethyl - 4' - thiazolyl) - 4 - isopropylidene-5-oxazolone from 2 - (2' - phenylacetamido-1'-thioacetyl-2'-ethenyl)-4-isopropylidene-5-oxazolone and hydrogen chloride in tert-butanol;

N - (2' - methyl - 4' - thiazolylcarbonyl)-2-amino-3-methyl - 2 - butenoic acid from 2-(2'-acetamido-1'-thioacetyl - 2' - ethenyl)-4-isopropylidene-5-oxazolone and aqueous potassium hydroxide; and Tert-pentynyl N-(2' - phenoxymethyl - 4' - thiazolylcarbonyl) - 2 - amino - 3 - methyl-2-butenoate and tert-pentynyl 2 - (2' - phenoxymethyl - 4' - thiazolyl)-4-isopropylidene-5-oxazolone from 2-(2'-phenoxyacetamido-1'-thioacetyl - 2' - ethenyl)-4-isopropylidene-5-oxazolone and hydrogen chloride in tert-pentynyl alcohol.

The invention is also illustrated by the following detailed examples of the preparation of the new compounds of invention, but we do not intend that these examples limit the invention of these compounds.

EXAMPLE 1

(A) Starting material 2-(2-phenoxyacetamido-1-thioacetyl-2-ethenyl-) isopropylidene-5-oxazolone A mixture of 20 g. of penicillin V in 200 ml. of an anhydride was heated at 120–130° C. for 45 minutes under a helium atmosphere and then evaporated to dryness at reduced pressure. The dark oily residue obtained thereby was taken up in benzene and chromatographed through a silica gel (200 g.) column, using a mixture of benzene and ethyl acetate as the eluting solvent. The eluate was collected in 21 ml. fractions at 21 minute intervals, which were analyzed by thin layer chromatography and suitably combined for product isolation.

Fractions 43–82 were collected and evaporated. The residue was treated with ethyl ether, left in a refrigerator overnight, and 1.31 g. of crystals, M.P. 157–166° C., were collected. It was recrystallized from acetone (1 g. from 38 ml.) and nice, colorless crystals, melted at 172–74° C.; $\lambda$ max. (EtOH) 320 m$\mu$ ($\epsilon$ 28,800) were obtained.

Analysis.—Calcd. for $C_{18}H_{16}N_2O_5S$ (percent): C, 57.74; H, 4.84; N, 7.48; S, 8.57. Found (percent): C, 57.71; H, 4.79; N, 7.35; S, 8.72.

N - (2 - phenoxymethyl-4-thiazolecarbonyl)-2-amino-3-methyl - 2 - butenoic acid and 2-(2-phenoxymethyl-4-thiazolyl-)-4-isopropylidene-5-oxazolone A solution of 1.0 g. of 2-(2-phenoxyacetamido-1-thioacetyl-2-ethenyl-)-4-isopropylidene-5-oxazolone in 40 ml. of methylene chloride was saturated with HCl gas and left at room temperature for 16 hours. The precipitated product was filtered and dried, giving 520 mg. of crystals. It was recrystallized from ethanol and nice, colorless crystals of thiazole acid, M.P. 178.5–179° C., were obtained.

Analysis.—Calcd. for $C_{18}H_{16}N_2O_4S$ (percent): C, 57.83; H, 4.85; N, 8.43; S, 9.65. Found (percent): C, 57.88; H, 4.79; N, 8.45; S, 9.67.

The filtrate (after 520 mg.) was evaporated to dryness and the residue recrystallized from ethanol, giving 320 mg. of colorless crystals, M.P. 133–34° C. After recrystallizations from a mixture of ethanol and acetone, the thiazole-oxazolone melted at 135–36° C.

Analysis.—Calcd. for $C_{16}H_{14}N_2O_3S$ (percent): C, 61.14; H, 4.49; N, 8.91; S, 10.20. Found (percent): C, 60.87; H, 4.63; N, 8.94; S, 10.43.

EXAMPLE 2

N-(2-methyl-4-thiazolecarbonyl)-2-amino-3-methyl-2-butenoic acid

To a solution of 564 mg. of 2-(2-phenoxyacetamido-1-thioacetyl - 2 - ethenyl-)-4-isopropylidene-5-oxazolone in 100 ml. of acetone 3 ml. of a solution of 2 normal sodium hydroxide was added and stirred at room temperature for 2 hours. The solvent was evaporated at a reduced pressure, the residue triturated with ethyl ether, and then dissolved in 60 ml. of 0.2 N hydrochloric acid. The solution was extracted with ethyl acetate, the extract washed with water, dried and the solvent evaporated to give an oil which was triturated with petroleum ether. The residue (490 mg.) was shaken on an ultrasonic vibrator with 12 ml. of water and the insoluble part filtered and washed with water, giving 150 mg. of N-(2-phenoxymethyl-4-thiazolecarbonyl)-2-amino-3-methyl-2-butenoic acid.

The filtrate was evaporated at reduced pressure and the residue (220 mg.) triturated with ether. Insoluble material melted at 192–94° C. It was recrystallized from ethanol and nice crystals of N-(2-methyl-4-thiazolecarbonyl)-2-amino-3-methyl-2-butenoic acid melted at 198–99° C. Mass spectrum showed molecular ion at m./e. 240.

Analysis.—Calcd. for $C_{10}H_{12}N_2O_3S$ (percent): C, 49.9; H, 5.04; N, 11.66; S, 13.35. Found (percent): C, 49.05; H, 5.26; N, 11.13; S, 13.05.

EXAMPLE 3

Methyl N-(2-phenoxymethylthiazole-4-carbonyl)-2-amino-3-methylbutenoate

A 3.0 g. portion of 2-(2'-phenoxyacetamido)-1'-thioacetyl - 2' - ethenyl)-4-isopropylidene-5-oxazolone was added to 50 ml. of methanol which had been previously saturated with hydrogen chloride and stirred at room temperature for 20 hours. The solvent was evaporated, and the residue was dissolved in 100 ml. of chloroform. The resulting solution was washed twice with a 5 percent solution of sodium bicarbonate. The organic layer was separated and dried. The solvent was evaporated and the residue was recrystallized from 12 ml. of ethanol, giving 1.65 g. of the title ester, M.P. 135–136° C.

Analysis.—Calcd. for $C_{17}H_{18}N_2O_4S$ (percent): C, 58.94; H, 5.23; N, 8.08; S, 9.25. Found (percent): C, 58.73; H, 5.19; N, 8.00; S, 9.37.

We claim:

1. A process for preparing a compound of the formula $$\begin{array}{c} R \\ | \\ C \\ \diagup \diagdown \\ N \quad S \\ | \quad | \\ C = CH \\ | \\ CO-NH-C-COOR' \\ \| \\ C \\ \diagup \diagdown \\ CH_3 \quad CH_3 \end{array}$$

which comprises reacting an oxazolone compound of the formula $$R-CO-NH-C=CH-S-\overset{O}{\underset{\|}{C}}-CH_3$$
$$\begin{array}{c} | \\ C = N \quad CH_3 \\ | \quad | \quad \diagup \\ O \quad C=C \\ \diagdown \quad \diagdown \\ C \quad CH_3 \\ \| \\ O \end{array}$$

with an acid or a base in the presence of an inert organic liquid, an alcohol, or an aqueous medium, in which, in the above formulae, R is hydrogen, a hydrocarbon group having from 1 to 12 carbon atoms, phenoxymethyl, or phenylmercaptomethyl, and R' is hydrogen or the ester residue of an alcohol present in the reaction mixture.

2. A process as defined in claim 1 wherein an inert organic solvent saturated with hydrogen chloride is mixed with an oxazolone wherein R is phenoxymethyl to form a compound wherein R is phenoxymethyl, and R' is hydrogen.

3. A process as defined in claim 1 wherein an aqueous alkali metal hydroxide solution is mixed with an oxazolone wherein R is phenoxymethyl to form a compound wherein R is phenoxymethyl and R' is hydrogen.

4. A process as defined in claim 1 wherein an alcohol saturated with hydrogen chloride is mixed with an oxazolone wherein R is phenoxymethyl to form a compound wherein R is phenoxymethyl, and R' is the ester residue of the alcohol present in the reaction mixture.

5. A process as defined in claim 4 wherein methanol saturated with hydrogen chloride is mixed with 2-(2'-phenoxy-acetamido - 1 - thioacetyl - 2' - ethenyl)-4-isopropylidene - 5 - oxazolone to form methyl N-(2-phenoxymethylthiazolyl-4-carbonyl)-2-amino-3-methylbutenoate.

References Cited
UNITED STATES PATENTS
3,594,389   7/1971   Cooper _____ 260—302 R RICHARD J. GALLAGHER, Primary Examiner U.S. Cl. X.R.

260—302 H